(12) United States Patent
Linde

(10) Patent No.: US 7,715,792 B2
(45) Date of Patent: *May 11, 2010

(54) REDUCED INSTRUCTION SET BASEBOARD CONTROLLER

(75) Inventor: Joakim Linde, Palo Alto, CA (US)

(73) Assignee: Broadcom Corporation, Irvine, CA (US)

(*) Notice: Subject to any disclaimer, the term of this patent is extended or adjusted under 35 U.S.C. 154(b) by 1061 days.

This patent is subject to a terminal disclaimer.

(21) Appl. No.: 11/402,808

(22) Filed: Apr. 13, 2006

(65) Prior Publication Data

US 2006/0183424 A1   Aug. 17, 2006

Related U.S. Application Data

(62) Division of application No. 10/101,396, filed on Mar. 18, 2002, now Pat. No. 7,082,285.

(60) Provisional application No. 60/278,493, filed on Mar. 23, 2001.

(51) Int. Cl.
*H04B 5/00* (2006.01)
*H04Q 7/20* (2006.01)

(52) U.S. Cl. ........................ 455/41.2; 712/214

(58) Field of Classification Search ............. 712/214, 712/215, 244, E9.062; 455/41.2
See application file for complete search history.

(56) References Cited

U.S. PATENT DOCUMENTS

| | | | |
|---|---|---|---|
| 4,373,180 A * | 2/1983 | Linde | ............. 712/239 |
| 6,697,638 B1 | 2/2004 | Larsson et al. | |
| 7,082,285 B2 | 7/2006 | Linde | |
| 2002/0071477 A1 | 6/2002 | Orava | |

OTHER PUBLICATIONS

"Specification of the Bluetooth System", Bluetooth, vol. 2, Version 1.0B, Dec. 1, 1999, 440 pgs.

* cited by examiner

*Primary Examiner*—Lee Nguyen
(74) *Attorney, Agent, or Firm*—Sterne, Kessler, Goldstein & Fox PLLC

(57) ABSTRACT

In wireless communications such as in the Bluetooth communication system, an execution unit sequentially receives software instructions for execution. Prior to completing each instruction, the execution unit issues an interrupt indicating the upcoming completion of the instruction execution and awaits receipt of the next instruction. A Link Manager issues limited instructions, and a Link Controller includes a hardware execution unit for executing the limited instructions. A processing unit in the Link Manager performs remaining functions under control of a software program.

17 Claims, 3 Drawing Sheets

REDUCED INSTRUCTION SET BASEBOARD CONTROLLER

CROSS-REFERENCES TO RELATED APPLICATIONS

This application is a divisional of application Ser. No. 10/101,396, filed Mar. 18, 2002, which claims priority from U.S. Provisional Application No. 60/278,493, filed Mar. 23, 2001, both of which are incorporated by reference herein in their entirety.

BACKGROUND OF THE INVENTION

The present invention relates to wireless communications, and more particularly to a method for implementing the Bluetooth Communication standard.

Along with the proliferation of handheld devices, cell phones, laptops, personal computers and other electronic devices comes a desire to enable those devices to communicate with one another without cumbersome and expensive wires between them. Thus, wireless technology is gaining popularity in the industry and is expanding rapidly. One of those technologies emerging from the various different proposals for implementing wireless communications is the so-called Bluetooth protocol. The Bluetooth protocol uses radio transmissions to transfer both voice and data in real-time. Bluetooth technology allows users to make effortless, wireless and instant communications between various wireless devices.

The Bluetooth system provides both point-to-point connections (only two Bluetooth devices involved), or point-to-multipoint connections (more than two Bluetooth devices). In the point-to-multipoint connection, a communication channel is shared among several Bluetooth devices. Two or more devices sharing the same channel form a "piconet." In a piconet, one Bluetooth unit acts as the master of the piconet, whereas the other units act as slaves. The master controls access to the channel.

Multiple piconets with overlapping coverage areas form a "scatternet." Each piconet has only one master; however a master in one piconet can be a slave in another piconet. This allows for continually flexible configurations. FIG. 1 is a simplified diagram illustrating a scatternet 100 with several Bluetooth devices networked in multiple piconets under the Bluetooth protocol. A first piconet 101 comprises devices 103, 105, 107, and 109. Device 103 is the master device while devices 105, 107 and 109 are slave devices. A second piconet 111 comprises devices 109, 113, and 115. In second piconet 111, device 109 is the master device (though it was the slave device in first piconet 101) and devices 113 and 115 are slave devices. A third piconet 117 is comprised of master device 119 and slave devices 115 and 121.

Each Bluetooth device includes a radio transceiver and a host processor. A link controller and a link manager provide the hardware and software interfaces respectively between the radio transceiver and the host processor. The Bluetooth protocol defines various functions that must be carried out to communicate between the master devices and the slave devices. Those functions are described in the Specification of the Bluetooth System; Ver 1.0B dated Dec. 1st, 1999 which is incorporated by reference herein for all purposes. However, the Bluetooth protocol does not define specifically how those functions are to be carried out in the actual devices. One issue that arises in a design of those devices is the question of which functions are to be done in hardware and which functions are to be done in software. Of course, the answer involves trade-offs in design time, flexibility and testing. Because of the robust functionality of the Bluetooth protocol, a design done completely in hardware becomes very complex. That complexity leads to lots of hardware with its accompanying size, costs, power, testing, design, time-to-market, error correction and other problems. The known hardware designs to date that implement the link controller (Baseband) functionality in hardware are very large. On the other hand, a software implementation has difficulty in meeting the strict timing constraints placed upon the various tasks that are to be performed. Such systems use DSPs or very powerful CPUs to implement the Baseband functionality. Such processors are large by both size and gate count and consume lots of power. They also are expensive parts. Thus, it is desirable to design a system that finds a more appropriate balance between hardware and software.

Another issue that arises in design of complex hardware and software systems such as a Bluetooth protocol is the communication between the hardware and the software. One way in which software and hardware communicate is through the use of a scheduling table. In the past, the scheduling table has been implemented as a list of instructions to the hardware. Several instructions are typically written to the table well in advance of their actual execution. That is, the link manager sets it up in advance with a series of instructions that are executed sequentially. However, such a method involves the use of lots of hardware and is limited in its flexibility. Thus, a new method of communicating with a scheduling table is desirable.

DETAILED DESCRIPTION OF THE INVENTION

Figure 1:
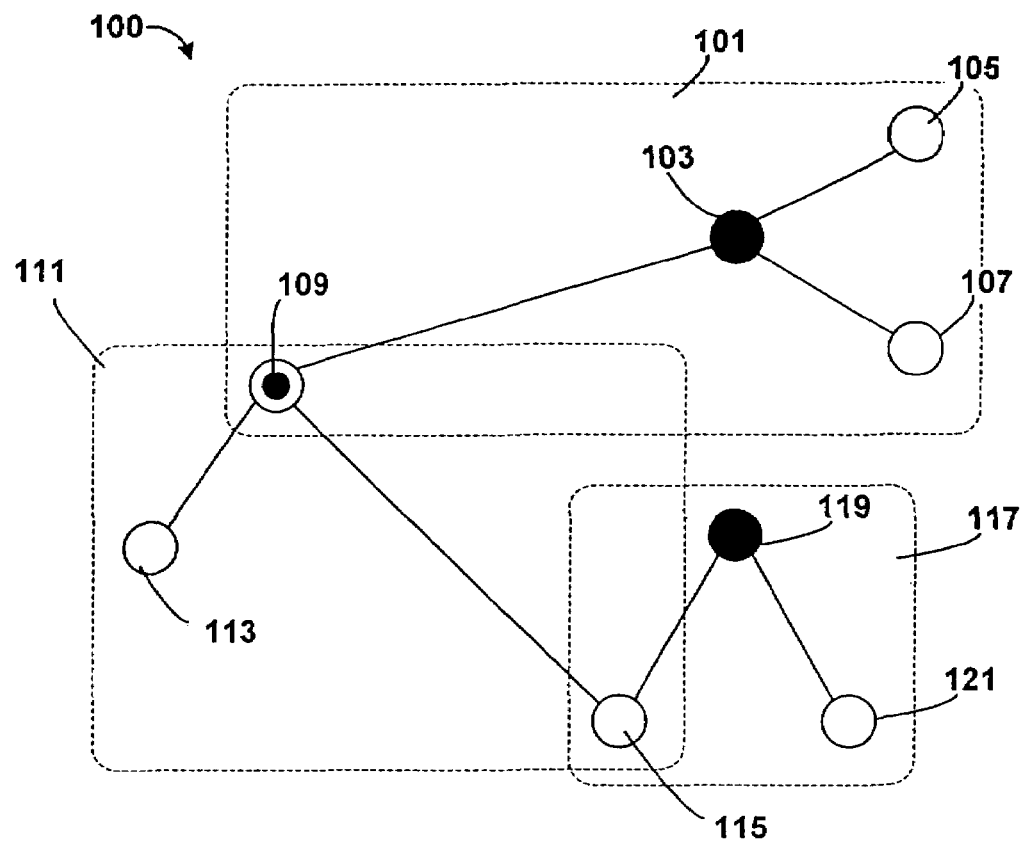
FIG. 1 is a simplified diagram illustrating devices networked in multiple piconets under the Bluetooth protocol.
Figure 2:
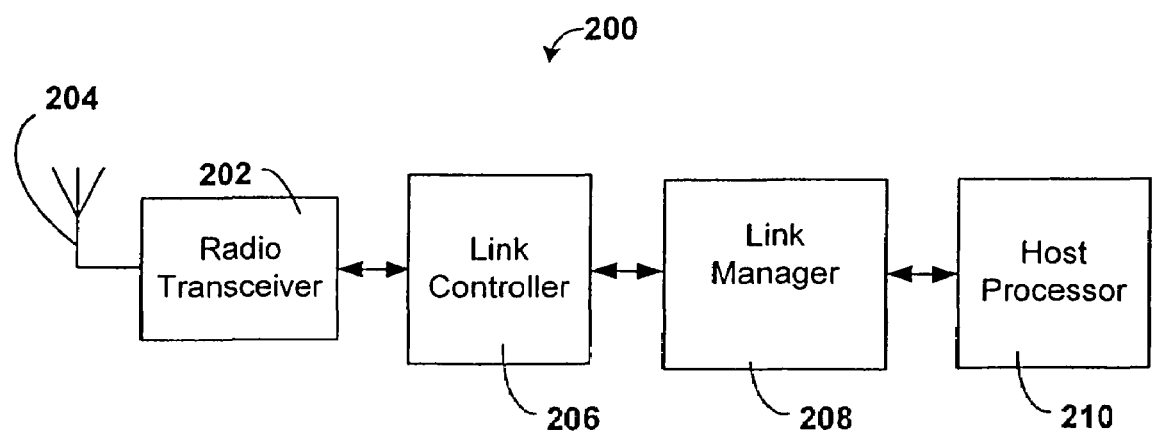
FIG. 2 is a simplified diagram of an exemplary system in which the present invention may be embodied.

FIG. 2 is a simplified diagram of an exemplary communication system 200 in which the present invention may be embodied. This diagram is merely an illustration and is not intended to limit the scope of the claims herein. One skilled in the art would recognize many other variations, modifications, and alternatives that may also be used with the principles disclosed in this specification without departing from the spirit and scope of the claimed inventions. Moreover, though described herein in the context of the Bluetooth protocol, the principles described herein are extendable to other protocols and no limitations to the particular protocol beyond those found in the claims are intended.

System 200 includes a radio transceiver 202 coupled with an antenna 204 and a Link Controller 206. Radio transceiver 202 receives radio frequency (RF) signals via antenna 204, and converts those RF signals to Baseband data signals and provides the Baseband data signals to Link Controller 206. Additionally, radio transceiver 202 receives Baseband data signals for transmission from Link Controller 206 and converts the Baseband data to an RF signal, which it transmits via the antenna 202.

Link Controller 206 is also coupled with Link Manager 208. Link Controller 206 implements low-level communication link protocols in hardware and provides an interface to radio transceiver 202. It includes one or more execution units that operate on software instructions from Link Manager 208. Link Manager 208 implements higher-level network link protocols in software. Link Manager 208 also interfaces with a host controller 210. Host controller 210 may implement still higher-level network link protocols and user-level applications. Link Controller 206 uses transmit (TX) buffers and receive (RX) buffers for the data that is to be transmitted and received by the device. In the specific embodiment, only one of each is provided to minimize the gate count. In other embodiments, multiple buffers may be used to remove timing constraints that arise from shuffling the data. Link Controller 206 places data just received in the RX buffer, and data to be transferred during the next TX slots is placed in the TX buffer.

System 200 may be used to implement a communication protocol such as the Bluetooth communication protocol or the like. As described above, the Bluetooth communication protocol provides a flexible system for point-to-point and point-to-multipoint communications. The Bluetooth system is a packet-based communication system and full duplex communication is accomplished using a TDD scheme. Also, Bluetooth utilizes a frequency hop system to combat interference and fading.

Figure 3A:
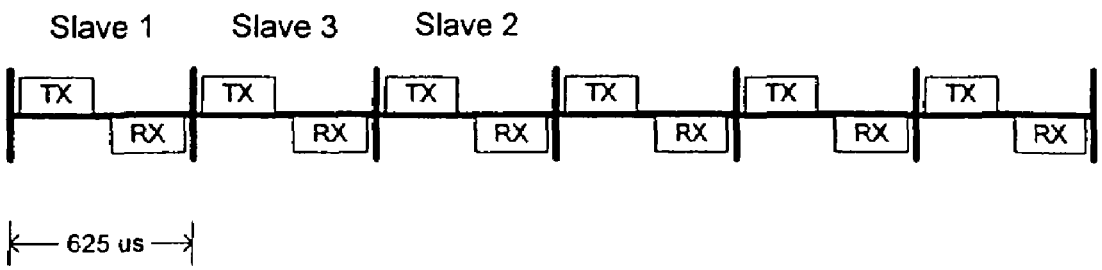
FIGS. 3a-3c are timing diagrams showing how the channel is divided into time slots to be shared by various devices.

The Bluetooth protocol divides the time on the channel into periods of time called "slots." Each slot is a fixed period of time controlled by the master device's clock. FIG. 3 is a time diagram showing how time is shared on the channel between various devices. In the specific embodiment shown in FIG. 3, each slot is 625 μs. During each slot, the Master device communicates with a different slave device. Thus, during the first time slot shown, the Master device communicates with Slave device 1. During the second time slot, the Master devices communicates with Slave device 3 and in the third slot it communicates with Slave device 2. Moreover, each time slot is further divided into two portions such that during the first portion of the time slot, the initiating device transmits its request (TX) and during the second portion of the slot, the other device responds (RX). Such sharing of the channel continues as needed with each device.

Figure 3B:
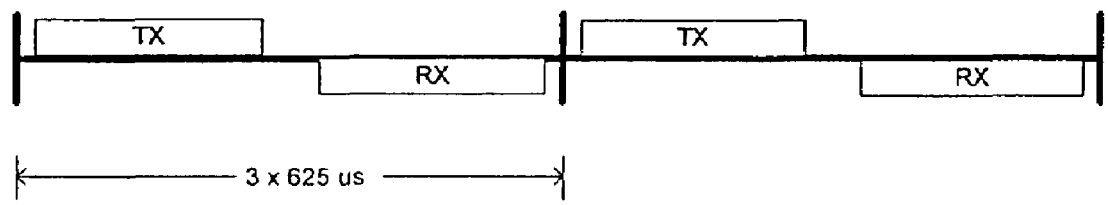
Figure 3C:
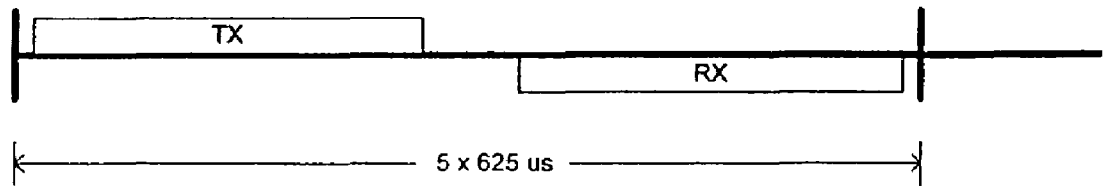

Moreover, communication between the devices need not be confined to a single slot only. If desirable, a particular master device may reserve the bus for communications over several time slots. Thus, in the specific embodiment each communication may extend over 3 or 5 time slots such that each slot is effectively 3×625 μs or 5×625 μs, respectively. FIGS. 3b and 3c show such communication extending across three and five slots, respectively.

An important issue in system 200 is the partitioning of functionality between hardware in Link Controller 206 and software in Link Manager 208. The present invention applies principles of RISC computer architecture design to the Bluetooth architecture to provide an efficient and practical partition between hardware and software. Thus, sufficient hardware is provided in Link Controller 206 to execute a minimal set of instruction for those functions that are time critical. The remaining non-time critical functions are performed by software in Link Manager 208. Thus, Link Manager 208 uses a microprocessor or other device to execute software instructions to perform functions that are relatively not time critical, and issues instructions to Link Controller 206 to execute in hardware to perform those functions that are time critical. Thus, the additional space, design time, testing, power consumption and the like associated with hardware implementations of functions is only incurred for those operations for which timing is critical. In the specific embodiment, time critical operations are defined as those that must be completed in less than 1 ms. Other embodiments may include some instructions that do not meet that strict specification without departing from the spirit and scope of the present invention. For example, some functions, though not particularly time critical, may be easily implemented in hardware without significantly increasing the costs.

Communication between Link Controller 206 and Link Manager 208 is through an instruction stack. Link Manager 208 writes instruction into the instruction stack one at a time and Link Controller 206 interprets and executes them in the order they were written. In the specific embodiment, the instruction stack is five instructions long—though typically only the first two entries in the instruction stack are used and Link Manager toggles between the two entries. As will be described in more detail below, Link Controller 206 requests a new instruction when the executing instruction is almost complete and Link Manager responds by writing its next instruction to the empty instruction register.

Communication may also take place through other registers. For example, a reset and abort register is a special hardware register provided in link controller 206. When a particular bit in the reset and abort register is set, the system performs some action. In the specific embodiment, the reset and abort registers include Abort, Master Reset, Page, and Page Scan entries. Setting the Abort entry causes the current instruction being executed to be aborted at the end of the current iteration. Abort can only be used on those instructions that have a variable length. Link Controller 206 checks the abort entry of the reset and abort register executing each iteration of the instruction. If the entry is set, it does not execute the instruction again and resets the entry. Setting the Master Reset entry resets Link Controller 206. It is checked and reset by Link Controller 206 between each instruction. Setting the Page and Page Scan entries resets a page state machine. The Page entry is checked between each instruction, while the Page Scan entry is checked between each repetition of each instruction.

Another form of communication is the use of interrupts. For example, Link Controller 206 uses interrupts to inform Link Manager 208 that it is ready for another instruction. Ideally, Link Manager 208 writes a new instruction to the instruction stack prior to Link Controller 206 completing execution of the previous instruction. This prior loading of the instruction stack allows Link Manager to form and write its instruction before the previous instruction has completed. Thus, the instructions can be consecutively executed without gaps between instructions. To accomplish that goal, Link Controller 206 issues an interrupt some time prior to its completion of an instruction. Preferably, it issues the interrupt long enough before it completes execution of the previous instruction to allow a new instruction to be loaded before the previous one completes. In the specific embodiment, the interrupt is given the name "WHAT'S UP" and is issued approximately 300 μs before completion of each instruction. Of course, the 300 μs time period is dependent upon the set up time associated with a new instruction. Other embodiments may have a significantly different time period.

In some instances, Link Manager 208 may fail to write a new instruction before Link Controller 206 completes execution of the previous instruction. If that happens, Link Controller 206 issues a "No Instruction" interrupt alerting link manager of its status. Typically, Link Manager 208 will issue and Idle instruction if it has no work for Link Controller 206 to perform, so the occurrence of a "No Instruction" interrupt typically signifies that some problem has occurred.

Figure 4:
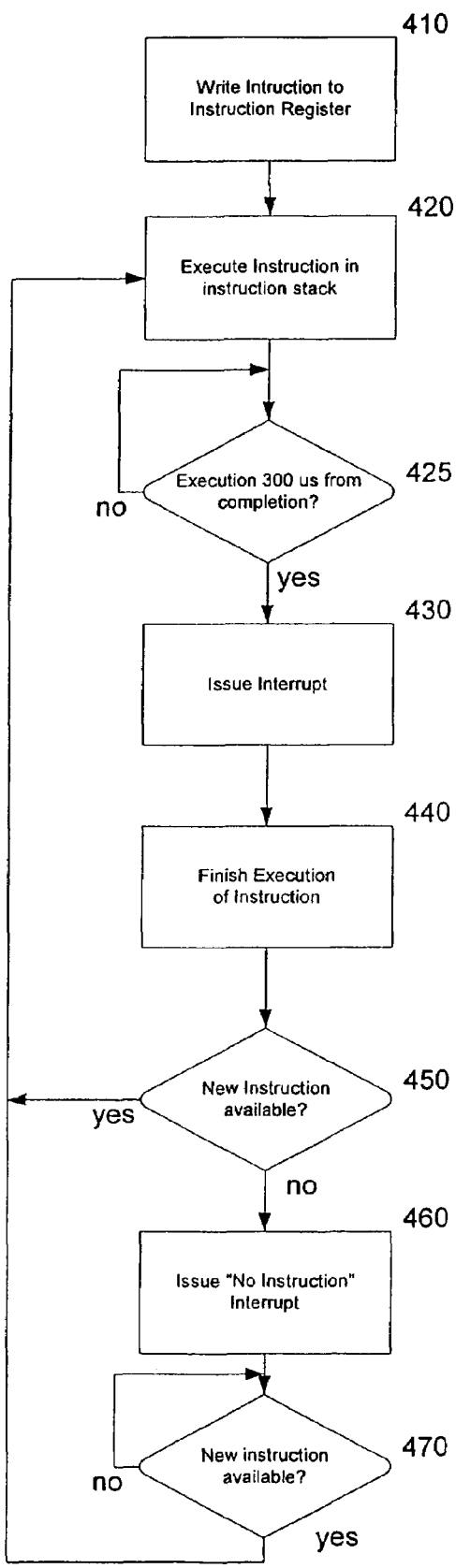
FIG. 4 is a flow diagram showing of a method for issuing interrupts to instruct the Link Manager to prepare the next instruction.

FIG. 4 shows a flow diagram that illustrates a method by which that interrupt protocol may be accomplished. In step 410, Link Manager 208 writes an instruction to the next instruction register in the instruction stack. At some time, Link Controller 206 reads that instruction register and begins executing the instruction in step 420. It continues to execute that instruction until it anticipates in step 425 that its execution will complete within a specified period of time (in the specific embodiment approximate 300 μs.) Of course, if the instruction is to execute for several repetitions as described above, it will continue to execute normally until the last iteration. Once Link Controller 206 determines that only the specified time period remains in the execution, it issues a "WHAT'S UP" interrupt in step 430. That interrupt signals to Link Manager 208 that the previous instruction is almost complete and it should write another instruction to the instruction stack.

After issuing the "WHAT'S UP" interrupt, Link Controller 206 completes execution of the previous instruction in step 440. After execution is finished, it looks to see if a new instruction is available in the instruction stack in step 450. If an instruction is available for execution, the method returns to step 420 and Link Controller 206 executes that new instruction. If no new instruction is available for execution, then in step 460 link controller 205 issues a "No Instruction" interrupt. The software in Link Manager 208 may use that information to detect its failure in giving new instructions to Link Controller 206 in time. If necessary, link manager may issue an IDLE instruction in the event an instruction cannot be written before the execution of the last instruction is completed to avoid a "no instruction" interrupt from occurring. After issuing the "no instruction" interrupt, Link Controller 206 remains in step 470 waiting for a new instruction to be issued. When it is issued, it returns to step 420 and executes the instruction.

In addition to the two interrupts described above, three other interrupts are defined in the specific embodiment. In keeping with the design philosophy, the number of interrupts is limited to minimize the amount of hardware in the design. Other embodiments may include more or fewer interrupts. The other three interrupts in the specific embodiment are "RX DATA" which indicates that data is available in the RX buffer, "CRC FAIL" which notifies the software of a CRC error, and RX FHS, which signifies that an FHS packet has been received, which may occur, for example, during an inquiry type instruction. The specific embodiment also provides a mask register for allowing the various interrupts to be masked if desired. For example, the "CRC FAIL" interrupt may be masked if the statistical information provided therefrom is not of interest. Also, one of either "WHAT'S UP" or "RX DATA" (but not both) may be masked to reduce the interrupt frequency, though it will be recognized that the time requirements may be increased if one is masked.

As described above, in the specific embodiment of the present invention, the set of instructions upon which Link Controller 206 operates is limited to provide an efficient partition between hardware and software. The instructions themselves are not necessarily equal in length. For example, in the specific embodiment, the shortest instructions last for 1.25 ms (i.e., the shortest frame defined by the Bluetooth specification) while the longest instructions have infinite length. Those instructions that are variable in length include a parameter that is passed with the instruction that indicates the number of times the instruction is to be repeated. A zero in the length field instructs Link Controller 206 to execute the instruction infinitely, ending only when an abort command is issued. Instructions are aborted by writing an "abort" bit in a special reset and abort register, described in more detail above. In the specific embodiment, twelve instructions are provided including Idle, Master ACL, Slave ACL, Master SCO, Slave SCO, Page, Page Scan, Inquiry, Inquiry Scan, Inquiry Response, Poll Unpark, and Request Unpark.

The following is a brief description of each of the instructions:

Master ACL

A Master ACL instruction sets up a master Asynchronous Connection-Less (ACL) frame in a master device. An ACL link is a point-to-multipoint link between the master and all the slaves participating in a particular piconet. According to the Bluetooth specification, any master device can establish an ACL link on per-slot basis. In the present embodiment, the Master ACL instruction is used to initiate that link. Besides its op-code, the Master ACL instruction includes three parameters: 1) piconet (2 bits) identifies the piconet number to be used. This parameter is always zero, except when doing a master-slave switch. 2) AM address (3 bits) is the Active Member address (AM_ADDR) to use in the packet header in the TX slot, i.e., the address of the packet. Normally, 1 to 7 are used as addresses, but zero is used if the message is a broadcast message. 3) TX Packet Type (4 bits)—identifies the packet type to be used in the packet header in the TX slot, i.e., the packet type of the transmitted packet.

The master frame has two interrupt points, both of them during the RX portion of the time slot. No interrupts are given during the TX portion of the time slot. The first interrupt point occurs immediately after the header is received or when the device determines that a correlation did not occur. At that time a "WHAT'S UP" interrupt is issued to alert Link Manager 208 to issue a new instruction. As described above, the "WHAT'S UP" interrupt is preferably issued before the end of the instruction. Status information such as no correlation, check sum error, incorrect address, incorrect sequence number, or header OK may be passed along with the interrupt. The second interrupt point occurs when the packet has been received and the radio has been turned off. When that occurs, Link Controller 206 issues an "RX DATA" interrupt to inform Link Manager 208 that new data is in the RX data buffer and it needs to be read out. Since the specific embodiment only has one RX data buffer, the data must be read out before additional data is received. Since, the data could come in the very next time slot, Link Manager 208 must be informed immediately of the data's existence. Of course, other embodiments may have additional RX data buffers so that requirement could be somewhat relaxed. If the data in a packet arrives, but the CRC is incorrect, a "CRC FAIL" interrupt may be issued at this point, instead of the "RX DATA" interrupt.

Slave ACL

A Slave ACL command is used in slave devices to set up a slave ACL frame to correspond to the master ACL frame in an ACL link. It is very similar to the Master ACL command except the RX happens before the TX. That is, it receives data from the master during the first portion of the time slot, and transmits during the second portion of the time slot. The length of the ACL frame varies depending on what is received and what is transmitted. Besides its op code, Slave ACL has two parameters: 1) piconet (2 bits) identifies the piconet number to be used. 2) TX Packet Type (5 bits) identifies the type of packet in the transmitted packet. If the packet type "Null Optional" is used, then it is not necessary for Link Controller 206 to send the null packet. Otherwise, a null packet type will force a null packet to be sent even if there is no header or payload information to send.

The slave ACL frame has two interrupt points, both of them during the RX slots. The first interrupt point is immediately after the header is received or if a correlation did not occur. At that time a "WHAT'S UP" interrupt is issued to drive the software to issue a new instruction. As described above, the "WHAT'S UP" interrupt is preferably issued before the end of the instruction. Status information such as no correlation, check sum error, incorrect address, incorrect sequence number, or header OK may be passed along with the interrupt. The other interrupt point is when the packet has been received and the radio has been turned off. When that occurs, Link Controller 206 informs the software that data is in the RX buffer and it needs to be read out so an "RX DATA" interrupt is given. If the data in the packet arrives, but the CRC is incorrect, a "CRC FAIL" interrupt may be issued at that point instead.

Master SCO

A Master SCO instruction sets up a master Synchronous Connection-Oriented (SCO) frame with one or more transmit and receives slots. The exact number of time slots is based on which packet type is being used. An SCO link is a symmetric, point-to-point link between the master and a specific slave. The SCO link reserves specific time slots. Accordingly, the SCO link can be considered as a circuit-switched connection between the master device and the slave device. Typically, an SCO link is used to support time-bounded information such as voice data. Dedicated master-to-slave and slave-to-master time slots are reserved for communicating in an SCO link. The master device sends SCO packets at regular intervals to the slave device in reserved master-to-slave time slots. The SCO slave device responds in the next slave-to-master slot. In an SCO link, data can be transferred either through the RX and TX buffers, or through a PCM interface.

The Master SCO instruction has three parameters: 1) AM Address (3 bits) indicates the active member address to use in the packet header in the TX slot. 2) TX Packet Type (4 bits) indicates the packet type that is to be used in the packet header in the TX slot. In the specific embodiment, the only valid packet type is audio type packet. Of course, in other applications other packet types may be supported by SCO links. 3) PCM (1 bit) indicates that the audio data will be transferred through the PCM interface rather than through the RX and TX buffers.

The master SCO frame has two interrupt points, both of them during the RX portion of the time slot. No interrupts are given during the TX portion. The first interrupt point is right after the header is received or when a correlation does not occur. At that time a "WHAT'S UP" interrupt is issued to drive the software to issue a new instruction. Status information such as no correlation, check sum error, incorrect address, incorrect sequence number, or header OK may be passed along with the interrupt. The other interrupt point is when the packet has been received and the radio has been turned off. When that occurs, Link Controller 206 informs the software that data is in the RX buffer and it needs to be read out so an "RX DATA" interrupt is given. Since the specific embodiment only has one RX data buffer, the data must be read out before additional data is received which could be in the next time slot. Of course, other embodiments may have additional buffers so that requirement could be somewhat relaxed. If the data in a packet arrives, but the CRC is incorrect, a "CRC FAIL" interrupt may be issued at this point, instead.

Slave SCO

The Slave SCO instruction is very similar to the Master SCO instruction except the RX portion of the time slot is before the TX portion of the time slot. It is executed on the slave device to set up an SCO link. The instruction includes three parameters: 1) Piconet (2 bits) indicates the piconet number of the slave frame. 2) TX Packet Type (4 bits) indicates the packet type to be used in the packet header in the TX slot. As with the Master SCO command, the specific embodiment only allows audio packet types. 3) PCM (1 bit) indicates that data will be transferred through the PCM interface instead of the RX and TX buffers.

The slave frame has two interrupt points, both of them during the RX portion of the time slot. No interrupts are given during the TX portion. The first interrupt point is right after the header is received or when a correlation does not occur. At that time a "WHAT'S UP" interrupt is issued to drive the software to issue a new instruction. Status information such as no correlation, check sum error, incorrect address, incorrect sequence number, or header OK may be passed along with the interrupt. The other interrupt point is when the packet has been received and the radio has been turned off. When that occurs, Link Controller 206 informs the software that data is in the RX buffer and it needs to be read out so an "RX DATA" interrupt is given. Since the specific embodiment only has one RX data buffer, the data must be read out before additional data is received which could be in the next time slot. Of course, other embodiments may have additional buffers so that requirement could be somewhat relaxed. If the data in a packet arrives, but the CRC is incorrect, a "CRC FAIL" interrupt may be issued at this point, instead.

Page

The Page instruction is used by a master device to activate and connect to a slave device. The Page instruction causes the master device to repeatedly transmit a "device access code" (DAC) associated with a particular slave device to get the slave device's attention. Slave devices periodically monitor the channel in Page Scan mode looking for master devices that may be paging them. Since the Bluetooth clocks of the master and slave devices are not necessarily synchronized, the master does not know exactly when the slave wakes up and on which hop frequency it is operating. Therefore, it transmits a train of identical DACs at different hop frequencies, and listens in between the transmit intervals until it receives a response from the slave device that it is paging.

In the specific embodiment, Link Controller 206 includes an internal state machine for executing the Page instruction. The instruction has five parameters: 1) AM address (3 bits) indicates the Active Member address to be put in the FHS packet sent to the slave after exchange of ID packets. This is the AM address that the slave will have in the connection established after the page is successfully completed. 2) Length (6 bits) indicates the maximum number of time slots that the Page instruction may last. If a connection to the slave device is established before the number of time slots have expired, the instruction may end sooner. If a length of zero is placed in the length field, the instruction will execute indefinitely until an abort command is issued as described above. 3) Clock Offset (26 bits) indicates the clock offset of the device being paged. 4) Scan Repetition (2 bits) indicates the Scan Repetition of the device being paged. In the specific embodiment, Link Controller 206 uses he information in Scan Repetition along with the Clock Offset to determine when the device being paged is listening and only pages the slave device at those times. The Scan Repetition is preferably encoded according to the Bluetooth Baseband specification. 5) Page Scan Mode (3 bits) indicates which page scan mode Link Controller 206 is to use when paging the slave device. Again, this parameter is preferably encoded according. to the Bluetooth Baseband specification.

The only interrupt allowed during the Page instruction is the previously described "WHAT'S UP" interrupt. When that interrupt is issued, status information may accompany it regarding what occurred during the Page instruction. For example, the interrupt may include information about whether a connection was successfully completed, whether it failed, or whether a timeout occurred. As with each of the instructions, the "WHAT'S UP" interrupt is preferably issued before the instruction has finished.

After a connection is made using the Page instruction, Link Manager 208 must poll the slave device before the connection is considered to be fully established.

Page Scan

The Page Scan instruction is the slave counterpart to the master's Page instruction. Each slave device periodically monitors the channel to determine if its DAC is being paged. The Page Scan instruction has only two parameters: 1) Piconet (2 bits) indicates the piconet number to be used. 2) Length (6 bits) indicates the maximum number of time slots that the Page Scan instruction may last; however, if a connection is established before that time, the instruction may end sooner. If a zero is entered in the length field, the instruction continues indefinitely until an abort command is issued.

The only interrupt allowed during the Page Scan instruction is the "WHAT'S UP" interrupt. In the specific embodiment, it is given approximately 300 us before the instruction ends, which may be because a connection is made, a page response timeout, or a length timeout. When that interrupt is issued, status information may accompany it regarding what occurred during the Page Scan instruction. For example, the interrupt may include information about whether a connection was successfully completed, whether it failed, or whether a timeout occurred.

Link Controller 206 maintains a state machine to execute the Page Scan instruction. It keeps the state machine running in the background between page scan instructions. When Page Scan identifies that the device has been paged, Link Manager 208 monitors the payload of the FHS packet to determine which device issued the page. It uses the information in the page to determine the clock offset between the master's clock and the native clock. In the specific embodiment, the clock offsets are maintained in a piconet table maintained by Link Controller 206.

Inquiry

In the Bluetooth system, an inquiry procedure is defined to be used when the destination's device address is unknown to the source. For example, such a procedure may be useful for public facilities such as printers, FAX machines, access points to a LAN, etc. Alternatively, the inquiry procedure may be used to determine other Bluetooth devices that may be within range. When an Inquiry is sent by a device, it collects the device addresses and clocks of all units that respond to its Inquiry. The device may then use that information to make a connection to one or more of them using the previously described page procedures.

In the specific embodiment, the Inquiry instruction causes an inquiry to be sent. The Inquiry instruction includes three parameters: 1) Length (10 bits) indicates the length of the Inquiry instruction in slots. If a length of zero is given, the instruction will execute indefinitely until Link Manager 208 issues an abort command. 2) GIAC (1 bit) indicates that the inquiry should be made using the general inquiry access code (GIAC). That value is stored in a configuration table and indicates that the DIAC information will be ignored. Even if the DIAC information is used, the GIAC is fetched from the configuration table to be used for frequency hopping calculations. 3) DIAC (64 bits) indicates a dedicated inquiry access code (DIAC) that is to be used by the inquiry instruction.

Two interrupts may be given during the inquiry instruction. First, a "WHAT'S UP" interrupt may be given before the end of the instruction. That interrupt may include status of what happened during the page such as whether it completed and acknowledged all received FHS packets or whether the instruction is nearly completed an FHS packet is currently being received. Second, "RX FHS" interrupt is issued when an FHS packet has been received and the FHS packet payload has been place in the RX buffer.

Inquiry Scan

The Inquiry Scan instruction is the counterpart to the Inquiry instruction. It instructs the receiver to scan for the inquiry access code long enough to completely scan for 16 inquiry frequencies. It may scan for the general inquiry access code or for one or more dedicated inquiry access codes. The Inquiry Scan instruction has only one parameter: 1) Length (11 bits) indicates the maximum number of slots that the instruction may last. If an ID packet is received before the end of that time, the instruction may end earlier. Also, if a zero is specified in the length field, the instruction will continue indefinitely until an ID packet is received or link controller 208 issues an abort command.

The only interrupt allowed during the Inquiry Scan instruction is the "WHAT'S UP" interrupt. It is issued before the end of the instruction, which typically ends when an ID packet is received or the length timeout is reached. It may include status information such as whether the Inquiry Scan was executed without receiving an ID packet or whether an ID packet was received.

Inquiry Response

In response to the Inquiry Scan instruction, Link Controller 206 will only detect the receipt of the ID packet. If an ID packet is received, Link Manager 208 will wait a random number of slots and then schedule an Inquiry Response instruction to try and receive a second inquiry ID packet and send an FHS packet. The FHS packet is used to establish the timing and frequency synchronization between the master device and the slave device. The Inquiry Response instruction is done in the slave device. It has no parameters.

The only interrupt for the Inquiry Response instruction is the "WHAT'S UP" interrupt. It is given before the end of the instruction, which typically ends because an ID packet has been received or the length timeout has occurred. It may include status such as whether an ID packet was received and the FHS packet was sent.

Poll Unpark

If a slave device is to be temporarily idle, it may be placed in a "park" mode. In the park mode, a device neither transmits nor receives information. Periodically, the master device polls those slave devices that are parked to determine whether they are requesting to be unparked. The Poll Unpark instruction is the vehicle by which Link Manager 208 accomplishes that function. The Poll Unpark instruction causes Link Controller 206 to send a broadcast message and listen for ID packets coming from the slaves. Since it is a broadcast message, the piconet parameter is implicitly zero, the AM address is implicitly zero and the instruction has a length of one frame (2 time slots). The Poll Unpark instruction has only one parameter: 1) TX Packet Type (5 bits) indicates the type of packet type to be used in the packet header in the TX slot.

Only one interrupt is provided, namely the "WHAT'S UP" interrupt. The "WHAT'S UP" interrupt is issued before the end of the instruction and may include status of what happened during the instruction such as whether an ID packet were received and if so, in which position or positions it was received.

Request Unpark

In response to the Poll Unpark instruction, the slave device may reply with a Request Unpark. This is a primitive used to build an access window. The access window gives the parked slaves a chance to request an Unpark. Link Controller 208 issues a Request Unpark instruction to accomplish that only upon receipt of the Poll Unpark frame. The instruction includes one parameter: 1) Pos (1 bit) indicates whether the ID packet should be sent in the first position or the second position in the RX slot.

The only interrupt is the "WHAT'S UP" interrupt which is given after the header has been received or after a no correlation has been detected. The interrupt may include status information such as whether correlation occurred, whether the check sum was correct, whether the AM address in the packet header was correct, whether the sequence number was correct, or whether the header was correct.

Idle

An Idle instruction is given to designate a number of slots on which no activity will occur. The Idle instruction includes two parameters: 1) Piconet (2 bits) indicates the number of the piconet that will be used to clock and time the Idle instruction. 2) Length (9 bits) indicates the number of slots the instruction will last. Though the instruction will end automatically at the end of the specified length, the instruction may also be ended by an abort command.

The only interrupt defined during the Idle instruction is the "WHAT'S UP" interrupt that is issued before the end of the instruction. As discussed above, the specific embodiment issues that interrupt approximately 300 us before the end of the instruction. If an abort command is issued, the "WHAT'S UP" interrupt is given to acknowledge its receipt.

Though the Bluetooth Specification defines many other functions, the above instructions are the only ones that are issued to hardware in Link Controller 206 in the specific embodiment. The instruction set is believed to be an optimum compromise between hardware and software complexity. It allows the most time critical functions to be done in hardware, relieving some of the need for very high powered processors, while not making the hardware overly complex and unwieldy.

Most of these instructions described above have parameters, which are given together with the instructions, much as is commonly known in the field of microprocessor instruction sets. Additionally, other parameters vary over time or are associated with a particular link. Those parameters are not necessarily associated with or unique to a particular instruction and are given through registers and tables. In the specific embodiment, the following tables are provided.

"Configuration Table" holds the information needed to configure the Bluetooth device such as LC version, LAP, UAP, NAP, Scan Repetition, Scan Period, Class of Device, Page Scan Mode, Sync Word, Reserved bits, Hop Sequence Page Response Timeout, Correlation Threshold, GIAC, Radio Parameters, Link Delay, Synth on Delay, RX Delay, TX Delay, Test Modes, Whitening On/Off, TX Frequency if zero hop sequence, and RX Frequency if zero hop sequence.

"Master Piconet Table" contains information about the native piconet, i.e., the piconet in which the device is the master. It includes entries such as Clock, Frame Timing, Encryption On/Off for broadcasts, Encryption key for broadcasts, Encryption key length for broadcast, and Default TX Power Level.

"Slave Piconet Table" contains information about the piconets in which a slave device resides. In the specific embodiment, this table is an array with up to three values for parameters such as Sync Word, UAP, LAP, Clock, Frame Timing, AM Address, Decrypt key for broadcast, Decrypt key length for broadcast, Encryption On/Off for AM address, Decrypt key for AM address, Decrypt key length for AM address, Encryption On/Off for broadcast, Decrypt key for broadcast, Decrypt key length for broadcast, and TX Power Level.

"Link Table" contains information that is specific for each link to the slave in the piconet where the unit is the master. In the specific embodiment, this table is an array with up to seven entries for each device. It includes parameters such as Correlation Window Size, Encryption On/Off for AM address, Encryption key for AM address, Encryption key length for AM address, and TX Power Level.

"State Table" contains information about the internal states of Link Controller 206. In includes entries for Instruction State, Page State, and Page Scan State.

"Clocks Table" maintains clock information for each piconet. In the specific embodiment, there are four clocks in Link Controller 206, one for each piconet. Thus, the table is an array of four entries with each entry including parameters such as Clock and Frame Timing.

A specific embodiment of the present invention has been described herein. The specific embodiment is directed toward the Bluetooth protocol. However, using the principles described herein, one may readily see application of the inventions described herein in other applications. The above description is intended only as a description of the specific embodiment known to the inventors as the best mode presently known. It is not intended to limit the invention any further than the limitations described in the attached claims.

What is claimed is:

1. A method of operating a Bluetooth device, comprising:
issuing a first software instruction to an execution unit;
executing the first software instruction using the execution unit;
completing the execution of the first software instruction; and
prior to completing the execution of the first software instruction, issuing an interrupt from the execution unit indicating the upcoming completion of the execution of the first software instruction.

2. The method of claim 1 wherein the interrupt is issued about 300 μs before completion of the execution of the first software instruction.

3. The method of claim 1 further comprising:
issuing a second software instruction prior to completing the execution of the first software instruction; and
executing the second software instruction immediately upon completing the execution of the first software instruction.

4. A method of issuing instructions to an execution unit, comprising:
issuing a first instruction to the execution unit;
executing the first instruction using the execution unit;
completing the execution of the first instruction;
prior to completing the execution of the first instruction, issuing an interrupt from the execution unit indicating the upcoming completion of execution of the first instruction; and
issuing a second instruction in response to the interrupt.

5. The method of claim 4, wherein the first instruction is issued to a first instruction register and the second instruction is issued to a second instruction register.

6. The method of claim 4, wherein the first instruction register and the second instruction register are included in an instruction register stack.

7. The method of claim 4, further comprising:

issuing a second interrupt if said second instruction has not been issued prior to completing the execution of the first instruction.

8. A system to execute instructions in a Bluetooth device comprising:

an instruction stack;

a link controller coupled to the instruction stack and enabled to execute instructions from the instruction stack;

a link manager coupled to the instruction stack and the instruction execution unit and enabled to write instructions to the instruction stack;

wherein the link controller issues a request for an instruction to the link manager prior to completing execution of a first instruction; and wherein the link manager writes an instruction into the instruction stack in response to the request from the link controller.

9. The system of claim 8, wherein the link controller issues a first interrupt to request an instruction from the link manager.

10. The system of claim 9, wherein the first interrupt includes one or more error indicators.

11. The system of claim 10, wherein the error indicators include one or more of check sum error, absence of correlation error, incorrect address error and incorrect sequence error.

12. The system of claim 9, wherein the first interrupt is issued approximately 300 us before the completion of execution of the first instruction.

13. The system of claim 9, wherein the link controller is enabled to issue a second interrupt if the link manager fails to write an instruction to the instruction stack after receiving the first interrupt.

14. The system of claim 8, wherein the link controller is enabled to issue an interrupt to the link manager that indicates availability of data in a read buffer.

15. The system of claim 8, wherein the link controller is enabled to issue an interrupt to the link manager that indicates that a received data packet has an incorrect Cyclic Redundancy Check (CRC) code.

16. The system of claim 8, wherein the link controller is enabled to execute an instruction multiple times based on a bit value in a particular field of an instruction.

17. The system of claim 16, wherein writing a specified bit in a particular register causes termination of execution of an instruction being executed multiple times by the link controller.

* * * * *